Jan. 24, 1928.
J. A. SMITMANS
1,657,286
MANIPULATOR FOR ROLLING MILLS
Filed Dec. 14 1925
3 Sheets-Sheet 1
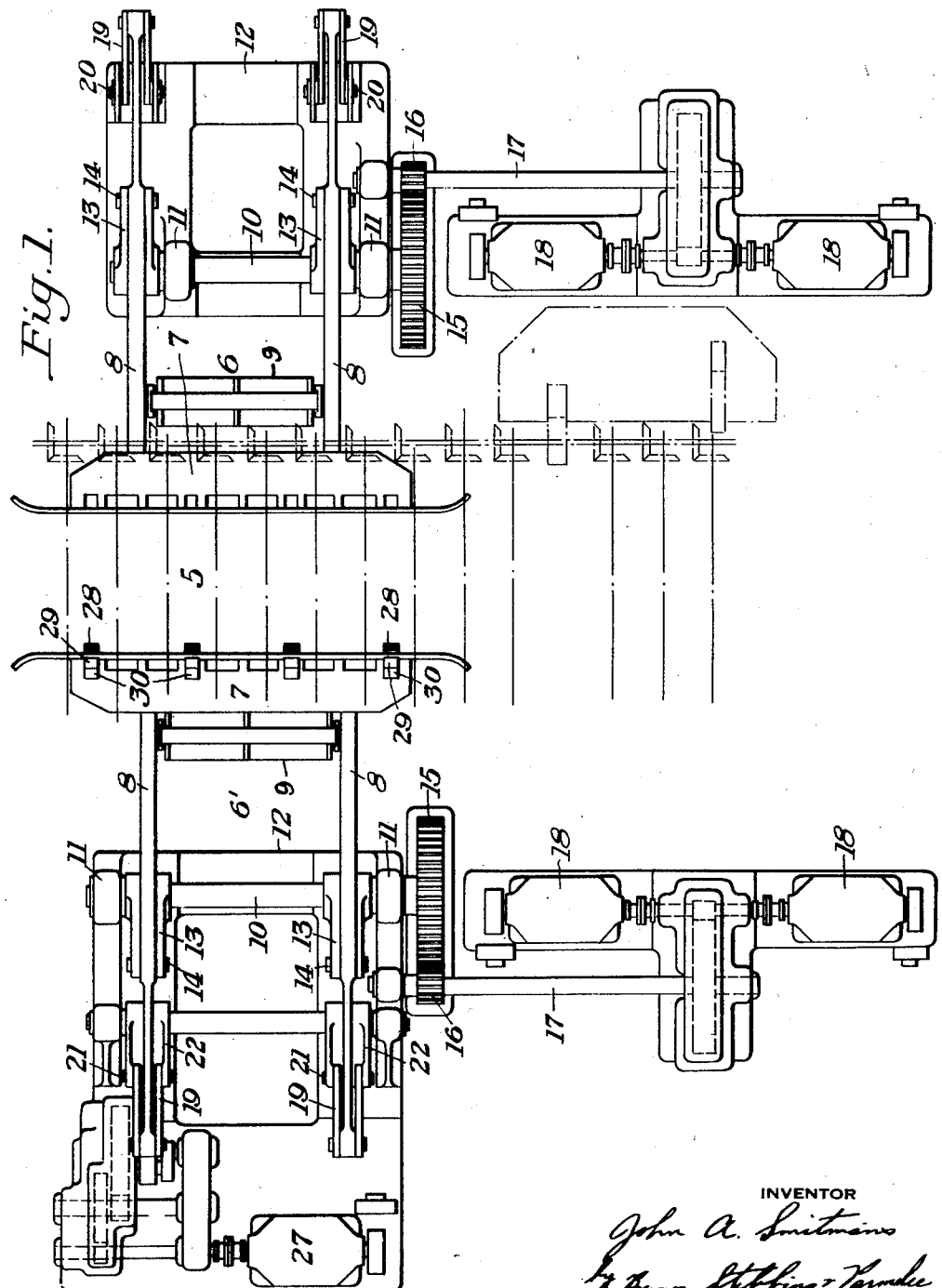
INVENTOR
John A. Smitmans

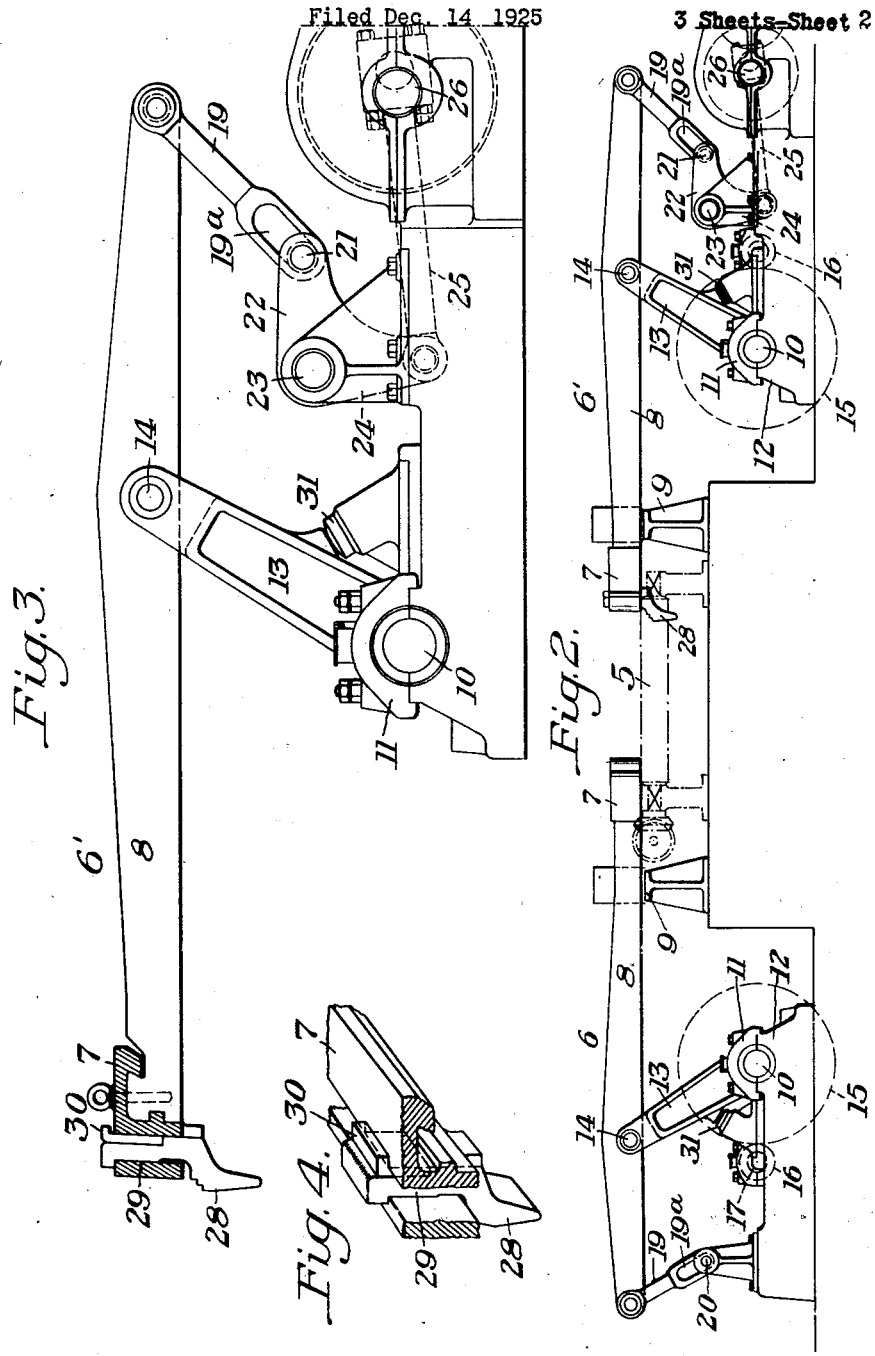

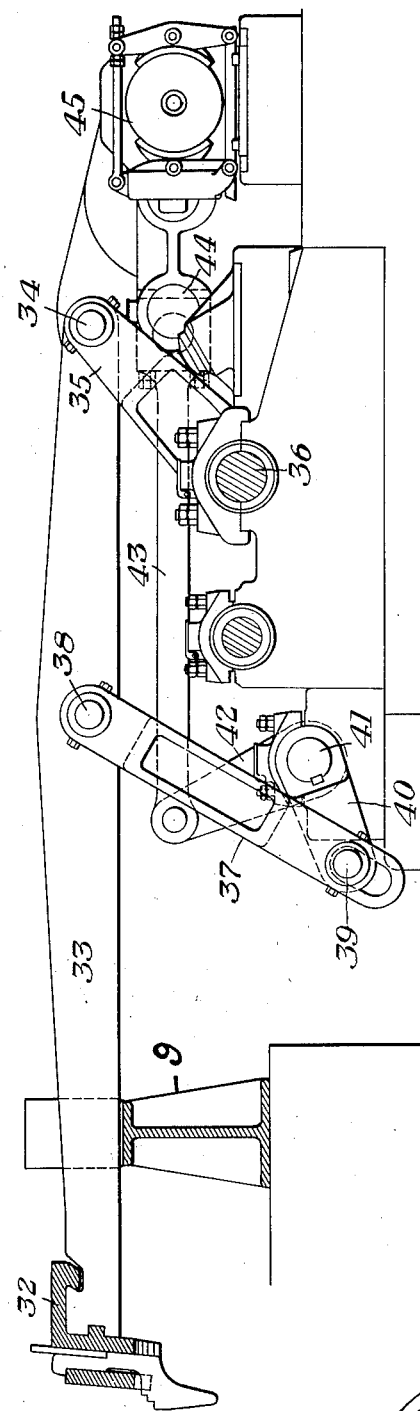

Patented Jan. 24, 1928.

1,657,286

UNITED STATES PATENT OFFICE.

JOHN A. SMITMANS, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

MANIPULATOR FOR ROLLING MILLS.

Application filed December 14, 1925. Serial No. 75,186.

This invention relates to rolling mills, and more particularly to a manipulator for use in connection with roll tables.

The invention proposes to provide a novel and simplified construction of manipulator wherein the manipulator or guide bars may be operated in a more simple and less expensive manner and with greater flexibility than in constructions heretofore provided for this purpose, and by means of which rack and pinions, or vector or cam shaped supports as heretofore sometimes employed in apparatus of this kind, may be eliminated.

The invention further proposes to provide a novel arrangement by means of which one or both of the manipulator bars may be actuated for edging or turning a billet or other object being rolled.

The invention may be readily understood by reference to the accompanying drawings which illustrate certain preferred embodiments of a complete unit constructed in accordance with my invention but to the particular construction and arrangement of which my invention is not confined.

In the drawings—

Figure 1 is a plan view showing a roll table, indicated in broken lines, and the manipulator units embodying my invention associated therewith;

Figure 2 is a side elevation of the apparatus shown in Figure 1;

Figure 3 is a side elevation on a larger scale of the manipulator bar at one side of the table arranged to effect the edging or turning of billets, part of the bar being in section;

Figure 4 is a perspective view of a portion of the manipulator guide bar and edging finger; and Figure 5 is a view similar to Figure 3 of a slightly modified construction.

In the drawings, 5 designates a roll table or other carrier, of any standard or preferred construction, and 6 and 6' are the manipulator units at each side thereof. Units 6 and 6' could be of identical construction, but unit 6 is preferably so arranged that it provides merely for the lateral movement of the manipulator bar whereas unit 6' is arranged to provide for a vertically tilting motion, when desired, of the manipulator bar so as to effect the edging of a billet, this vertical tilting motion being in addition to the usual range of lateral movement. This difference between the two units is, of course, in accordance with present standard rolling mill practice.

The unit 6 includes the usual side guard or manipulator bar 7 carried on parallel beams 8 and guided by the intervening support 9 so that the support may be effective both vertically and laterally, its effectiveness preferably being limited to preventing lateral movement of the beams whereby it does not impart any resistance to the normal operations of the apparatus.

The beams 8 are supported by a suitable link and lever mechanism by means of which they may be reciprocated to project or retract the bar 7 without imparting a swinging motion thereto. This mechanism preferably includes a transverse rock shaft 10 mounted in bearings 11 on a base 12 and having arms or levers 13 secured thereto. Levers 13 are preferably bifurcated as shown, and their upper ends are pivotally connected at 14 with the respective beams 8 between the ends thereof.

Rock shaft 10 may be reversely rotated by any suitably arranged mechanism. I have shown, as a preferred drive therefor, a gear 15 on the shaft 10 meshing with a driving pinion 16 on a shaft 17 driven through a suitable reducing gear from a reversible motor or motors 18. Tandem motors 18 are preferably utilized because of the greater flexibility of control obtained thereby, but to this arrangement or any specific arrangement for rocking levers 13, the invention is not confined. In the construction shown, the driving means 18 may be operated to rotate shaft 10, thereby swinging arms 13 through an arc to advance or retract bar 7.

If only the levers 13 were employed, the beams 8 would be rocked during their reciprocation in either direction. In order to prevent such undesirable movement of the beams 8 and impart a true or substantially true reciprocable motion thereto, a link 19 is pivotally connected to the outer end of each beam 8. Links 19, in the unit 6, have their lower ends secured to a normally fixed pivot 20 on the base 12. These links are substantially parallel with levers 13, but their length from the center of rotation is considerably less than that of the levers 13, so that links 19 serve to counteract the tendency of levers 13 to swing the beams 8, thereby causing the beams to be maintained horizontal as they are projected or retracted.

In the unit 6', the construction is identical with that described in connection with unit 6, so that corresponding reference numerals have been employed to designate the similar parts, but in the unit 6', the fixed pivot 20 is omitted. In place thereof, links 19 pivotally connect at 21 with the legs 22 of cranks on a rock shaft 23, the legs 24 being connected with a link 25 engaging an eccentric 26 driven through gearing, as shown, from a motor 27, for effecting operation of the shaft 23. Any suitable mechanism for rocking shaft 23 may be substituted.

It may be readily seen that, upon proper rotation of shaft 23, legs 22 may be rocked to pull down on the links 19, thereby raising the manipulator bar 7. Suitable fingers 28 are provided on the bar 7 for engagement with a billet for rolling or edging such billet. The fingers may be of any desired form. I have shown them as each having a shank 29 passing through a suitable vertical opening in the guide bar structure and retained therein by a removable keeper 30.

The lower ends of links 19 are preferably slotted at 19ª so that they may have a slidable engagement with pivots 21. This does not interfere with the usual operation of the links, but provides a sliding connection that prevents damage to the machine should the manipulator or guide bar be lowered onto a billet which it has edged, or be otherwise prevented from lowering to its full extent.

At 31 I have shown suitable cushioning devices which may be of any well known type, either fluid or spring actuated, for limiting the retracting swing of the arms 13.

A manipulator constructed in accordance with this invention is more simple than devices heretofore provided for this purpose and possesses greater strength and flexibility of control. By the provision of the operating arms 13, the manipulator may be reciprocated without the use of racks and pinions, while the links 19 always confine the movement of the manipulator bar to the proper horizontal plane. Such links, when connected with a movable pivot that may be normally fixed in a given position, provide a simple means for imparting an edging movement to the manipulator bar.

Instead of the arrangement of links just described, a reversed arrangement may be provided wherein the lever for operating the manipulator laterally is at the outer end of the beam while the confining link is pivotally connected to an intermediate part of the beam. Such an arrangement is shown in Figure 5.

In this figure, 32 designates the side guard or manipulator bar and 33 are the beams on which it is carried. Pivotally connected at 34 with the outer end of each beam 33 is a lever or crank 35 on a rock shaft 36, this crank and rock shaft corresponding in effect to the crank levers 13 and the rock shaft 10 of the structure first described. The shaft 36 may be rocked by any suitable means, such as that previously described, to extend or retract the side guard 32.

In order to confine the movement of the guide bar to the desired horizontal plane, a link 37 is pivotally connected at 38 to an intermediate point of the beam 33. This link is longer than lever 35 and has its lower end connected with a normally fixed pivot 39. By reason of this link, the bar 33 is confined to a desired plane of movement.

However, to effect an edging movement of the manipulator, the normally fixed pivot 39 may be at the outer end of a crank 40 on a rock shaft 41. This shaft may be rocked through a second crank 42, or link 43, eccentric 44 and the eccentric driving means 45. When this mechanism operates to rock the shaft 41, the link 37 will be moved vertically to raise or lower the bar 32.

It will be obvious that this construction possesses all of the advantages of simplicity and flexibility of the form first described while permitting the various parts to be more advantageously arranged for certain particular installations.

A further advantage of the present invention arises from the fact that the desired plane of movement of the side guard is obtained without the necessity of utilizing any slide bearings, any vector or segment shaped bearings, any cam guiding surfaces or racks and pinions. The supports carrying the manipulator are all movable, and being pivotal points they are constantly shielded from the accumulation of scale, dirt or other foreign matter, and may be effectively lubricated at all times.

I claim as my invention:

1. In a manipulator, a beam, a lever connected with the beam for reciprocating it, means for operating the lever, a link pivotally connected to the lever, a normally fixed pivot to which the link connects, said link and said lever being of relatively different effective lengths, and means for changing the position of the normally fixed pivot for rocking the beam.

2. In a manipulator, a beam, a lever connected with the beam for reciprocating it, means for operating the lever, a link pivotally connected to the lever, a normally fixed pivot to which the link connects, said link and said lever being of relatively different effective lengths and constituting the sole supporting means for the beam in a vertical direction, and means for changing the position of the normally fixed pivot for rocking the beam.

3. In a manipulator, a beam, and a link and lever movable about normally fixed centers of rotation for reciprocating the beam, and means for varying the center of rotation of the link for rocking the beam vertically.

4. In a manipulator, a beam, a lever connected with the beam between the ends of said beam, means for rocking the lever, a link connected adjacent the outer end of the beam, said link being shorter than the lever, a second lever to which the link is pivoted, and other means for rocking the second lever.

5. In a manipulator, a beam, a lever connected with the beam between the ends of said beam, means for rocking the lever, a link connected adjacent the outer end of the beam, said link being shorter than the lever, a second lever to which the link is slidably pivoted, and other means for rocking the second lever.

6. In a manipulator, a side guard, a pair of beams connected thereto, a rock shaft, a pair of levers on the rock shaft, each one of said levers being pivotally connected with a beam, means for rocking the shaft in opposite directions, and a link mechanism connected with the beams remote from the levers for normally confining the movement of the bar against any arcuate travel when the beams are reciprocated by the levers.

7. In a manipulator for rolling mills, the combination with a manipulator side guard, of a pair of beams on which the guard is carried, a rock shaft supported below the beams, a pair of levers on the rock shaft connected with the respective beams, a pair of links depending from the beams remote from the levers, said links being shorter than the levers, a second rock shaft, levers on the second rock shaft pivotally connected with the depending ends of the links, and independent means for rocking the two rock shafts.

8. In a manipulator for rolling mills, the combination with a manipulator side guard, of a pair of beams on which the guard is carried, a rock shaft supported below the beams, a pair of levers on the rock shaft connected with the respective beams, a pair of links depending from the beams remote from the levers, said links being shorter than the levers, a second rock shaft, levers on the second rock shaft pivotally and slidably connected with the depending ends of the links, and independent means for rocking the two rock shafts.

9. In a manipulator, a side guard, a beam to which the guard is secured, a lever pivotally connected with the beam, means for rocking the lever to reciprocate the beam, a link connected with the beam and with a normally fixed pivot, said link and said lever being of different effective lengths, and means for shifting the position of the normally fixed pivot.

In testimony whereof I have hereunto set my hand.

JOHN A. SMITMANS.